United States Patent [19]

Matsuura et al.

[11] Patent Number: 5,243,265
[45] Date of Patent: Sep. 7, 1993

[54] NON-CONTACT TRACING CONTROL APPARATUS

[75] Inventors: Hitoshi Matsuura, Hachioji; Eiji Matsumoto, Minamitsuru, both of Japan

[73] Assignee: Fanuc Ltd, Minamitsuru, Japan

[21] Appl. No.: 720,869

[22] PCT Filed: Dec. 11, 1990

[86] PCT No.: PCT/JP90/01622
§ 371 Date: Aug. 13, 1991
§ 102(e) Date: Aug. 13, 1991

[87] PCT Pub. No.: WO91/08861
PCT Pub. Date: Jun. 27, 1991

[30] Foreign Application Priority Data

Dec. 19, 1989 [JP] Japan .................. 1-328777

[51] Int. Cl.⁵ .............. G05B 19/18; G01B 11/24; B23Q 35/128
[52] U.S. Cl. .................. 318/578; 318/571; 318/579; 364/474.03; 364/474.37; 250/560; 356/376
[58] Field of Search ............ 318/560–660; 364/513, 474.01–474.30, 191–193, 478, 559, 167; 901/42, 46, 47; 250/202, 222.1, 221; 350/484; 356/376, 375

[56] References Cited

U.S. PATENT DOCUMENTS

| | | | |
|---|---|---|---|
| 3,840,739 | 10/1974 | Coulter | 318/577 X |
| 4,396,832 | 8/1983 | Henderson | 318/577 X |
| 4,625,104 | 11/1986 | Parker et al. | 318/577 X |
| 4,636,611 | 1/1987 | Penney | 318/577 X |
| 4,639,140 | 1/1987 | Lerat | 356/376 |
| 4,694,153 | 9/1987 | Bejczy et al. | 318/577 |
| 4,724,301 | 2/1988 | Shibata et al. | 318/577 X |
| 4,734,572 | 3/1988 | Gorman | 318/577 X |
| 4,864,147 | 9/1989 | Ikari et al. | 250/560 |
| 4,933,541 | 6/1990 | Dufour | 318/577 X |
| 4,949,024 | 8/1990 | Matsuura | 318/567 |
| 4,952,772 | 8/1990 | Zana | 318/577 |
| 4,969,107 | 11/1990 | Mizutani | 364/513 |
| 4,969,722 | 11/1990 | Akeel | 350/484 |
| 4,999,555 | 3/1991 | Yamazaki et al. | 318/578 |
| 5,006,999 | 4/1991 | Kuno et al. | 364/513 |
| 5,067,086 | 11/1991 | Yamazaki et al. | 364/474.08 |
| 5,083,073 | 1/1992 | Kato | 318/577 |

Primary Examiner—Paul Ip
Attorney, Agent, or Firm—Staas & Halsey

[57] ABSTRACT

A non-contact tracing control apparatus is disclosed which traces the surface of a model by using at least two optical distance detectors for detecting the distances therefrom to the model. When a first light corresponding to a first of the optical distance detectors is detecting a distance, a second light of another, second optical distance detector is either dimmed or shut off. Interference between more than one light reflected from the model and errors from, i.e., the first light reflected from the model incident on a second position sensor of the second optical distance detector can be avoided. The distances to a plurality of measurement points thus can be detected without interference even though the measurement points on the surface of the model are relatively close to one another.

6 Claims, 4 Drawing Sheets

NON-CONTACT TRACING CONTROL APPARATUS

CROSS-REFERENCE TO RELATED APPLICATION

This application is related to U.S. application Ser. No. 07/668,499 filed on Mar. 18, 1991.

BACKGROUND OF INVENTION

1. Technical Field

The present invention relates to a non-contact tracing control apparatus which fetches positional data in succession while tracing the shape of a model by using detectors, to originate NC data or effect tracing work, and more particularly, to a non-contact tracing control apparatus in which a system for driving optical distance detectors is improved.

2. Background Art

A conventional tracing control apparatus uses a contact-type probe as a tracer head, and obtains displacement information by bringing the probe into contact with the surface of model thereby to control the feeding speed or to originate NC data.

If the surface of a soft model is traced by using this tracer head, however, the model surface will be damaged by the pressure with which the contact-type probe is held against the model, and thus there has recently been developed a non-contact tracing control apparatus in which a distance detector for detecting the distance to the model surface in a non-contact manner is fixed to the distal end of the tracer head. An optical distance detector is used for this distance detector.

FIG. 4 illustrates the principle of the optical distance detector, where a semiconductor laser oscillator 43 is excited by a laser driver circuit 42, and outputs a laser beam 44; the laser beam 44 is condensed by a projector lens 45 and applied to the surface of a model 20c; the applied laser beam 44 is reflected by the surface of the model 20c, and part of a reflected light beam 46 is converged on a position sensor 48 by a light receiving lens 47.

The position sensor 48 is used for converting the reflected light beam 46 into an electrical signal corresponding to the position of the converging point and the quantity of light. Therefore, when the model 20c is on a point P0 as illustrated, the reflected light beam 46 is converged on the center of the position sensor 48, and when the model 20c is on a point P1 or P2, the reflected light beam 46 is converged on the upper left or lower right portion of the position sensor 48. Since the position sensor 48 outputs a detection signal D corresponding to the position and quantity of the thus-converged reflected light beam 46 between the optical distance detector and the model 20c, a signal corresponding to the distance can be obtained by amplifying the detection signal D in a predetermined converter circuit.

This optical distance detector can detect only one-dimensional displacement information, and therefore, in a conventional tracing control apparatus, in order to obtain data in a direction normal to the surface of a model, which data are required to calculate a tool offset, for example, two or three optical distance detectors are employed to simultaneously determine the coordinates of three different points on the model surface, and a vetor in the normal direction is calculated from the coordinates of the three points. According to another attempt, a zigzag tracing path is generated, measurements are successively made on this tracing path by an optical distance detector to obtain the coordinates of three points, and a vector in the normal direction is calculated from the thus-obtained three successive coordinates.

With the first attempt mentioned above, when detecting the coordinates on the model surface by the two or three optical distance detectors fixed on a tracer head, however, a reflected light beam from the model surface is made incident on a position sensor or sensors of the other optical distance detector or detectors, as measurement points on the model surface are brought closer to one another, thus causing interference therebetween and making an accurate measurement of the distance impossible.

If the measurement points are made relatively more distant from one another, the interference can be prevented, but the gradient of the model surface will be unable to be accurately measured during a tracing operation.

DISCLOSURE OF THE INVENTION

It is an object of the present invention to provide a non-contact tracing control apparatus capable of detecting the distances to a plurality of measurement points without interference between reflections from the measurement points, even though the measurement points are relatively close to one another.

To solve the above mentioned and other problems, according to the present invention, there is provided a non-contact tracing control apparatus which traces the surface of a model by using at least two optical distance detectors for detecting the distances therefrom to the model, while, one of the optical distance detectors is detecting the distance, the other optical distance detector operates a radiated light and does not execute a detection of the distance.

While one of the optical distance detectors is detecting the distance, the other optical distance detector does not detect the distance. More specifically, when detecting coordinates on the surface of the model by using two or three optical distance detectors fixed on a tracer head, the remaining optical distance detector or detectors do not make a distance detection while one of the other optical distance detectors is detecting the distance on the surface of the model, and thus there will be no interference if a reflected light from the surface of the model is incident on a position sensor or sensors of the other optical distance detector or detectors accordingly the distances to a plurality of measurement points can be detected without interference even though the measurement points on the surface of the model are relatively close to one another.

BEST MODE OF CARRYING OUT THE INVENTION

An embodiment of the present invention will now be described with reference to the drawings.

Figure 1:
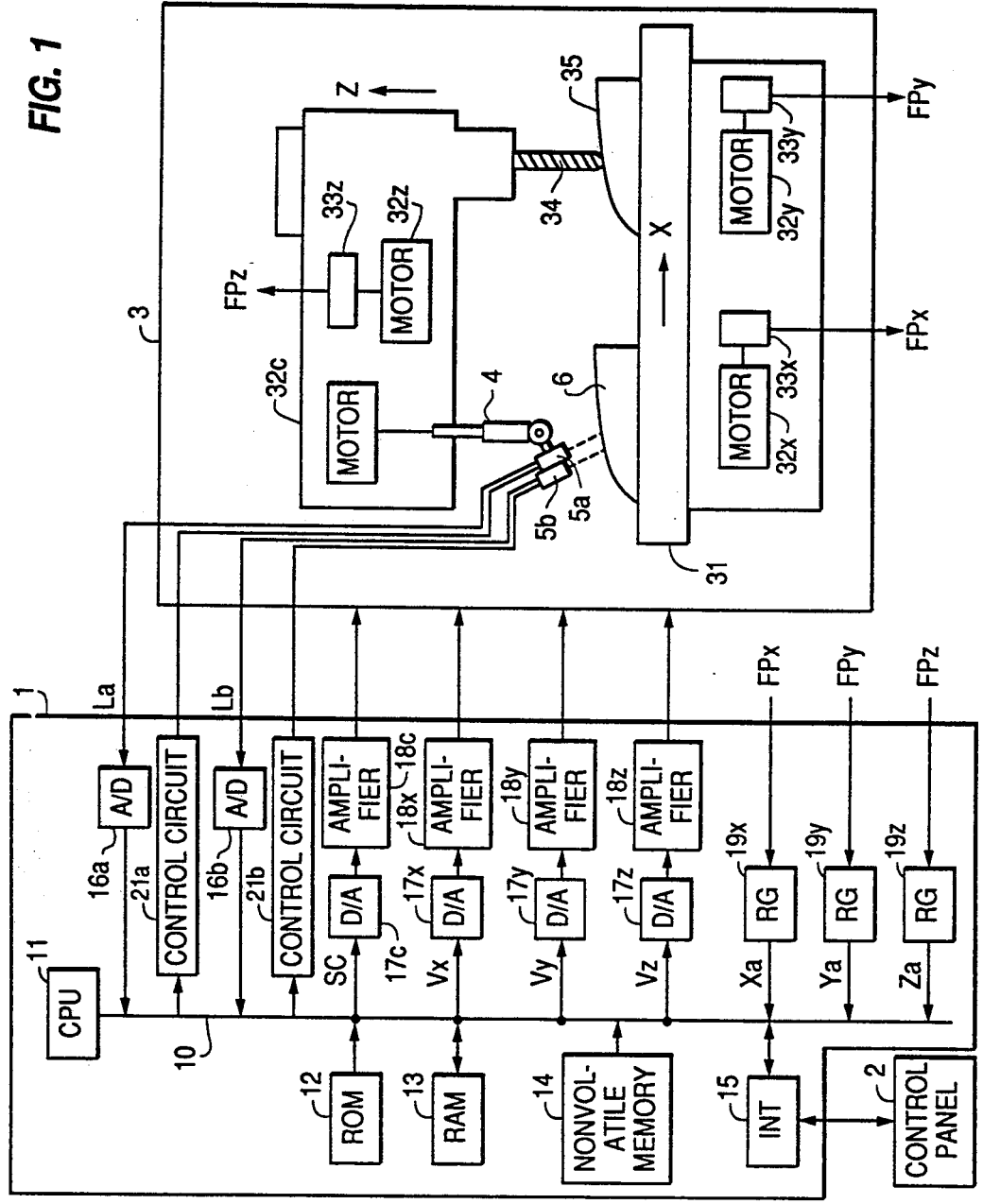
FIG. 1 is a block diagram showing an arrangement of a non-contact tracing control apparatus according to the present invention, and peripheral equipments thereof.

FIG. 1 is a block diagram showing an arrangement of a non-contact tracing control apparatus according to the present invention, and peripheral equipments thereof. In FIG. 1, a processor (CPU) 11 controls the general operation of the control apparatus 1, and a ROM 12 is loaded with a system program for controlling the control apparatus 1. Namely, the processor 11 reads out the system program in the ROM 12 through a bus 10, and controls the operation of the tracing control apparatus 1 in accordance with this system program.

A RAM 13, which is used to temporarily store various data, stores measured values from optical distance detectors 5a and 5b (mentioned later) and other data. A nonvolatile memory 14, which is backed up by a battery (not shown), stores various parameters, such as the tracing direction and speed, manually input from a control panel 2 through an interface 15.

A tracer head 4 in a tracing machine 3 is provided with the optical distance detectors 5a and 5b, which are each composed of a reflected-light type distance detector using a semiconductor laser or a light emitting diode as a light source, individually measure the distances to a model 6 in a non-contact manner.

Sensor control circuits 21a and 21b alternately switch the respective magnitudes of the light-projection power of the optical distance detectors 5a and 5b in response to a projection power control signal from the control apparatus 1, so as to alternately change the intensities of lights radiated from the optical distance detectors 5a and 5b.

Figure 3:
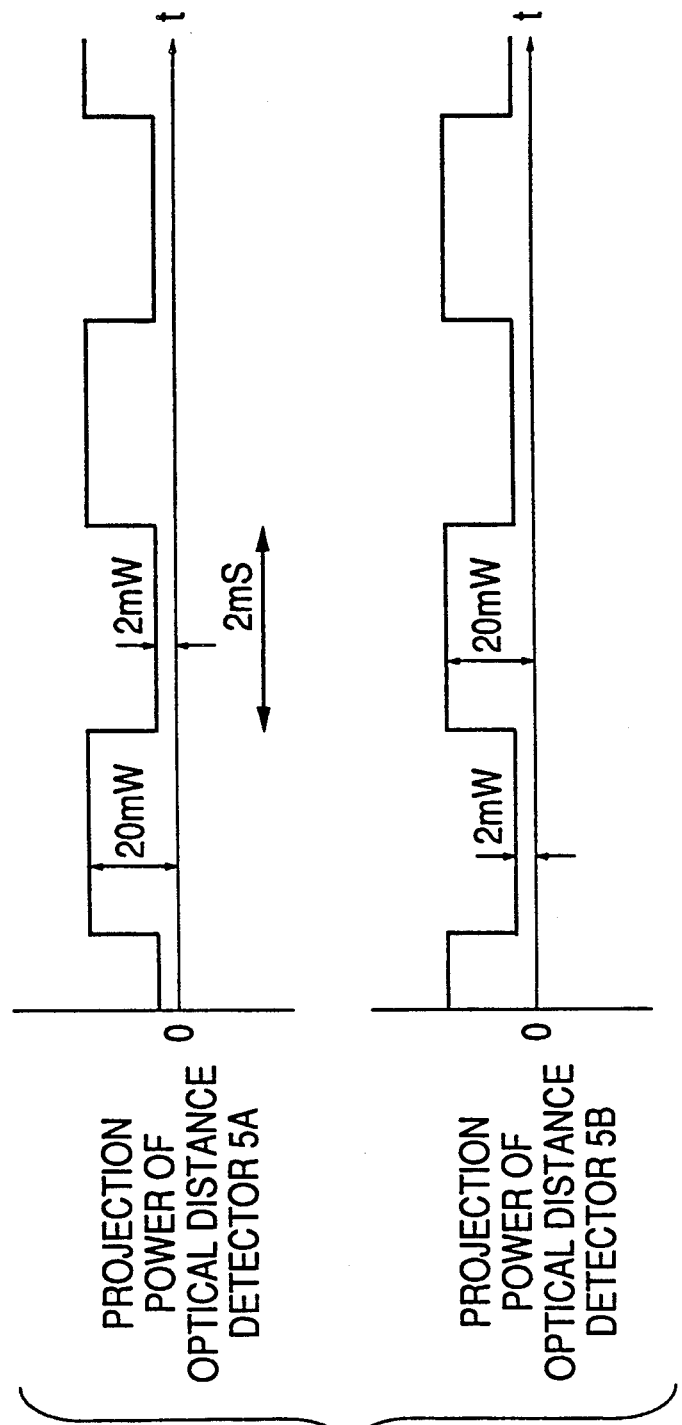
FIG. 3 is a diagram showing the respective states of the projection power of optical distance detectors.
Figure 4:
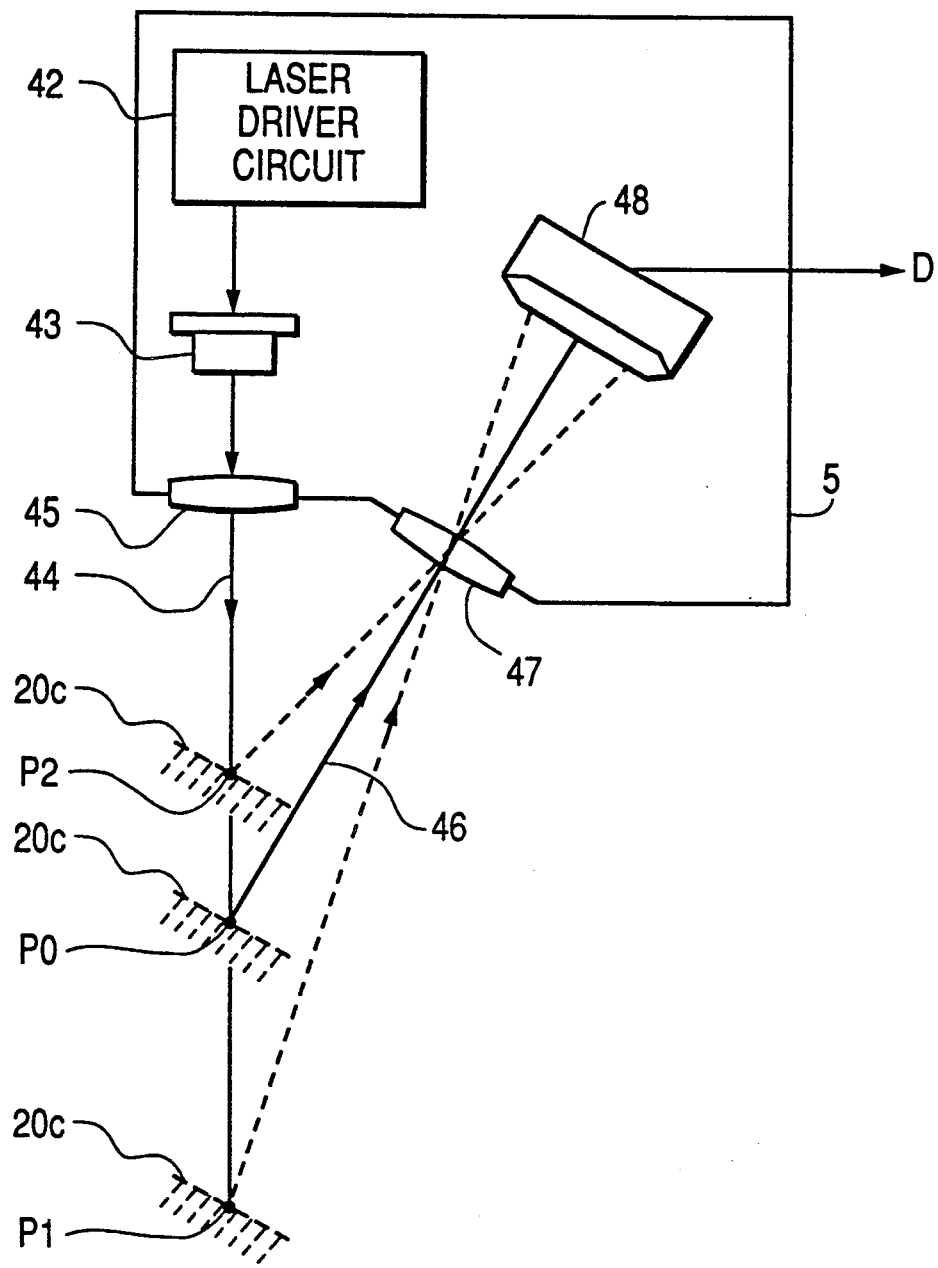
FIG. 4 is a diagram illustrating the principle of an optical distance detector.

FIG. 3 is a diagram showing the respective states of the projection power of the optical distance detectors 5a and 5b. For example, the optical distance detectors 5a and 5b alternately change their respective projection power between 20 mW and 2 mW, at intervals of 2 msec. Thus, while the one optical distance detector 5a is detecting the distance with a 20-mW projection power, the projection power of the other optical distance detector 5b is at 2 mW, and thus any interference between laser beams or lights from the optical distance detectors 5a and 5b is very small.

Further, the sensor control circuits 21a and 21b may be designed so as to alternately turn on and off the respective outputs of the optical distance detectors 5a and 5b in response to the projection power control signal from the control apparatus 1. In this case also, there is no interference between laser beams or lights emitted from the two optical distance detectors 5a and 5b.

Measured values La and Lb output from these optical distance detectors 5a and 5b are converted into digital values by A/D converters 16a and 16b, respectively, in the tracing control apparatus 1, and are read in succession by the processor 11.

The processor 11 calculates axial displacements in accordance with the measured values La and Lb and signals from current position registers 19x, 19y and 19z, which will be mentioned later, and further, generates speed commands Vx, Vy and Vz for individual axes in accordance with these calculated displacements and ordered tracing direction and speed, using a well-known technique. These speed commands are converted into digital values by D/A converters 17x, 17y and 17z, and are supplied to servo amplifiers 18x, 18y and 18z, and in response to these speed commands, the servo amplifiers 18x and 18y drive servomotors 32x and 32y of the tracing machine 3, to thereby move a table 31 in the X-axis direction and the Y-axis direction perpendicular to the drawing plane. Further, the servo amplifier 18z drives the servomotor 32z, to thereby move the tracer head 4 and a tool 34 in the Z-axis direction.

The servomotors 32x, 32y and 32z are provided with pulse coders 33x, 33y and 33z, respectively, which generate detection pulses FPx, FPy and FPz, respectively, every time the servomotors are rotated by a predetermined amount. The current position registers 19x, 19y and 19z in the tracing control apparatus 1 count the detection pulses FPx, FPy and FPz up or down, respectively, depending on the directions toward which the servomotors rotate, to thereby obtain current position data Xa, Ya and Za for the individual axis directions, and then supply the data to the processor 11.

While controlling the individual axes in this manner, the processor 11 samples the measured values La and Lb from the optical distance detectors 5a and 5b at predetermined sampling times, obtains a vector normal to the surface of the model 6 by using the sampling data, and generates a rotation command SC corresponding to the direction obtained by the projection of the normal vector on the X-Y plane. The rotation command SC is converted into a digital value by a D/A converter 17c, and is supplied to a servo amplifier 18c, and in response to this command SC, the servo amplifier 18c drives a servomotor 32c for a C-axis.

Accordingly, the tracer head 4 rotates in accordance with a command angle of the rotation command SC, and is controlled to be kept at a fixed distance from the model 6. At the same time, the table 31 moves at the ordered tracing speed and in the ordered tracing direction, so that a workpiece 35 is worked into the same shape as the model 6 by the tool 34 which, together with the tracer head 4, is subjected to Z-axis control.

Figure 2:
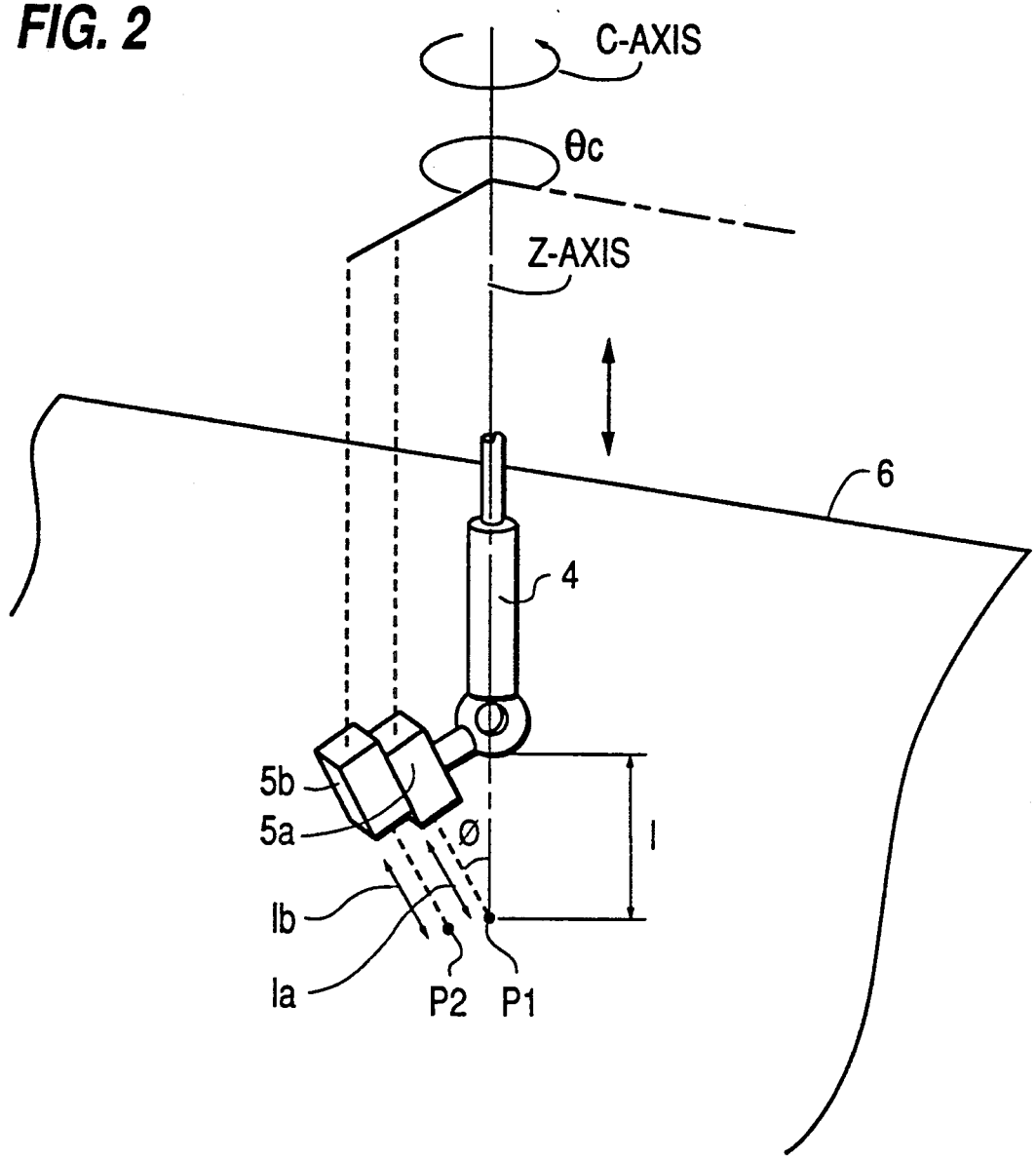
FIG. 2 is a detailed view of a tracer head.

FIG. 2 is a detailed view of the tracer head 4. In FIG. 2, the tracer head 4 is fitted with the optical distance detectors 5a and 5b such that they are inclined at an angle $\phi$ to the Z-axis. Each of the optical distance detectors 5a and 5b rotates for a command angle $\theta c$, based on the rotation command SC, along the circumference of a circle with a predetermined radius around the C-axis. Also, the optical distance detector 5b, which is mounted so as to overlap the outside of the optical distance detector 5a, is subjected to rotation control for the command angle $\theta c$.

By feeding back the measured value from the optical distance detector 5a to the tracing control apparatus, as mentioned before, a distance la from the optical distance detector 5a to a measurement point P1 on the model 6 can be kept fixed. This distance la is the distance from the optical distance detector 5a to the intersection of the measurement axis of the optical distance detector 5a and the Z-axis, and accordingly, the measurement point P1 does not move even though the tracer head 4 rotates around the C-axis, so that a distance l between the tracer head 4 and the model 6 also can be kept fixed.

The optical distance detector 5b detects a distance lb therefrom to a measurement point P2 on the model 6, and supplies the measured value to the tracing control apparatus 1.

In the embodiment described above, reflected-light type optical distance detectors are employed but the present invention may be applied to triangular-surveying-type distance detectors.

According to the present invention, as described herein, the distances to a plurality of measurement points can be detected without interference even though the measurement points on the surface of the model are relatively close to one another.

We claim:

1. A non-contact tracing apparatus capable of tracing a surface of a model, comprising
    at least two optical distance detectors, each of said at least two optical distance detectors including a sole laser configured above the model to output a laser beam and to reflect the laser beam from the model, and a position sensor having an array of light sensitive portions and configured adjacent to said sole laser and above the model to angularly receive the laser beam reflected from the model; and
    a central processing means for retarding the laser beam output of each laser of said optical distance detectors other than a selected one of said at least two optical distance detectors to sample each of the light sensitive portions of the selected one of the at least two optical distance detectors to detect the presence of the laser beam on one portion of said array of light sensitive portions.

2. An apparatus according to claim 1, wherein said central processing means retards the laser beam output of each laser by reducing a power of the laser beam.

3. An apparatus according to claim 2, wherein said central processing means reduces the power of the laser beam by about one tenth.

4. An apparatus according to claim 2, wherein said central processing unit alternatingly controls the selection of said optical distance detectors to obtain a distance detection signal from each of said optical distance detectors and determines a normal vector to a surface of the model based on the distance detection signals obtained from at least two of said optical distance detectors and based on a predetermined distance between adjacent of the at least two optical distance detectors.

5. An apparatus according to claim 1, wherein said central processing means retards the laser beam output of each laser by turning off the laser beam.

6. An apparatus according to claim 5, wherein said central processing unit alternatingly controls the selection of said optical distance detectors to obtain a distance detection signal from each of said optical distance detectors and determines a normal vector to a surface of the model based on the distance detection signals obtained from at least two of said optical distance detectors and based on a predetermined distance between adjacent of the at least two optical distance detectors.

* * * * *